United States Patent [19]

Bartley

[11] Patent Number: 4,716,544

[45] Date of Patent: Dec. 29, 1987

[54] VARIABLE DIMENSION AND VARIABLE ORIENTATION GRAPHICS BIT-MAP COMPUTER MEMORY

[75] Inventor: George S. Bartley, Waltham, Mass.

[73] Assignee: Minolta Camera Kabushiki Kaisha, Osaka, Japan

[21] Appl. No.: 486,733

[22] Filed: Apr. 20, 1983

[51] Int. Cl.[4] .................. G06F 7/00; G06F 15/626; G06K 9/32

[52] U.S. Cl. ............................. 364/900; 364/521; 382/46

[58] Field of Search ... 364/200 MS File, 900 MS File, 364/518, 521; 340/727, 748, 750; 377/54; 382/46, 41

[56] References Cited

U.S. PATENT DOCUMENTS

| | | | |
|---|---|---|---|
| 3,969,704 | 7/1976 | Liebel, Jr. | 364/900 |
| 3,976,982 | 8/1976 | Eiselen | 340/727 |
| 3,984,811 | 10/1976 | Nyssens et al. | 364/900 |
| 4,052,699 | 10/1977 | Micka et al. | 364/900 |
| 4,168,488 | 9/1979 | Evans | 340/727 |
| 4,312,045 | 1/1982 | Jean et al. | 340/727 |
| 4,471,349 | 9/1984 | Strolle | 340/727 |
| 4,486,745 | 12/1984 | Komo | 340/727 |

Primary Examiner—Archie E. Williams, Jr.
Assistant Examiner—William G. Niessen
Attorney, Agent, or Firm—Price, Gess & Ubell

[57] ABSTRACT

A memory storage scheme permitting storage of characters in one of several orientations in response to selected applied addresses, including a plurality of random access memory (RAM) chips organized into RAM SETS, each set including $N_B$ devices where $N_B$ equals the number of bits in a character, each device being organized as $N_R+1$ bits where $N_R$ is the number of bits stored in each device; each RAM SET describing R adjacent rows of bit map, each row containing $KN_B+1$ bits.

18 Claims, 2 Drawing Figures

FIG. 2

# VARIABLE DIMENSION AND VARIABLE ORIENTATION GRAPHICS BIT-MAP COMPUTER MEMORY

BACKGROUND OF THE INVENTION

The subject invention relates to memory device structure and organization and more particularly to a variable dimension and variable orientation method of organizing a bit-map. The bit-map organization allows characters to be placed in the bit-map in any of four orientations, and the bit-map accommodates any height-to-width ratio of an output device so long as the total number of bits required by the output device is less than the number of bits in the bit-map.

Such a memory device has application in systems for printing the output of such devices as word processors, and particularly in interfacing between a character generator ROM and a laser printer. In such apparatus, it is desirable to have the capability to print characters in various orientations on the page, for example, a page number in one orientation and graphical data at right angles thereto. Such printing can be accomplished by using additional ROM storage to store each character in several orientations. It has appeared to the inventor that a different strategy may be used which provides flexibility and greatly reduced ROM storage requirements. The subject invention provides a memory organization and a technique for generating addresses to the memory to permit input and output of characters in various orientations. The objects of the invention are several:

1. Make a bit-map memory for an output device that has variable height and width parameters.
2. Allow characters to be entered in the array in any orientation: normal, upside down, rotated 90° either left or right.
3. Easily change the number of bits in the bit-map by adding additional devices.

SUMMARY OF THE INVENTION

The invention provides a memory structure and means for addressing the memory structure to cause data bits representing a character to be stored in the memory structure in configurations representing one of a number of orientations of the character.

BRIEF DESCRIPTION OF THE DRAWINGS

FIG. 2 is a memory map illustrating mapping of a RAM set into a 2-dimensional array of bits.

DETAILED DESCRIPTION OF THE PREFERRED EMBODIMENT

Figure 1:
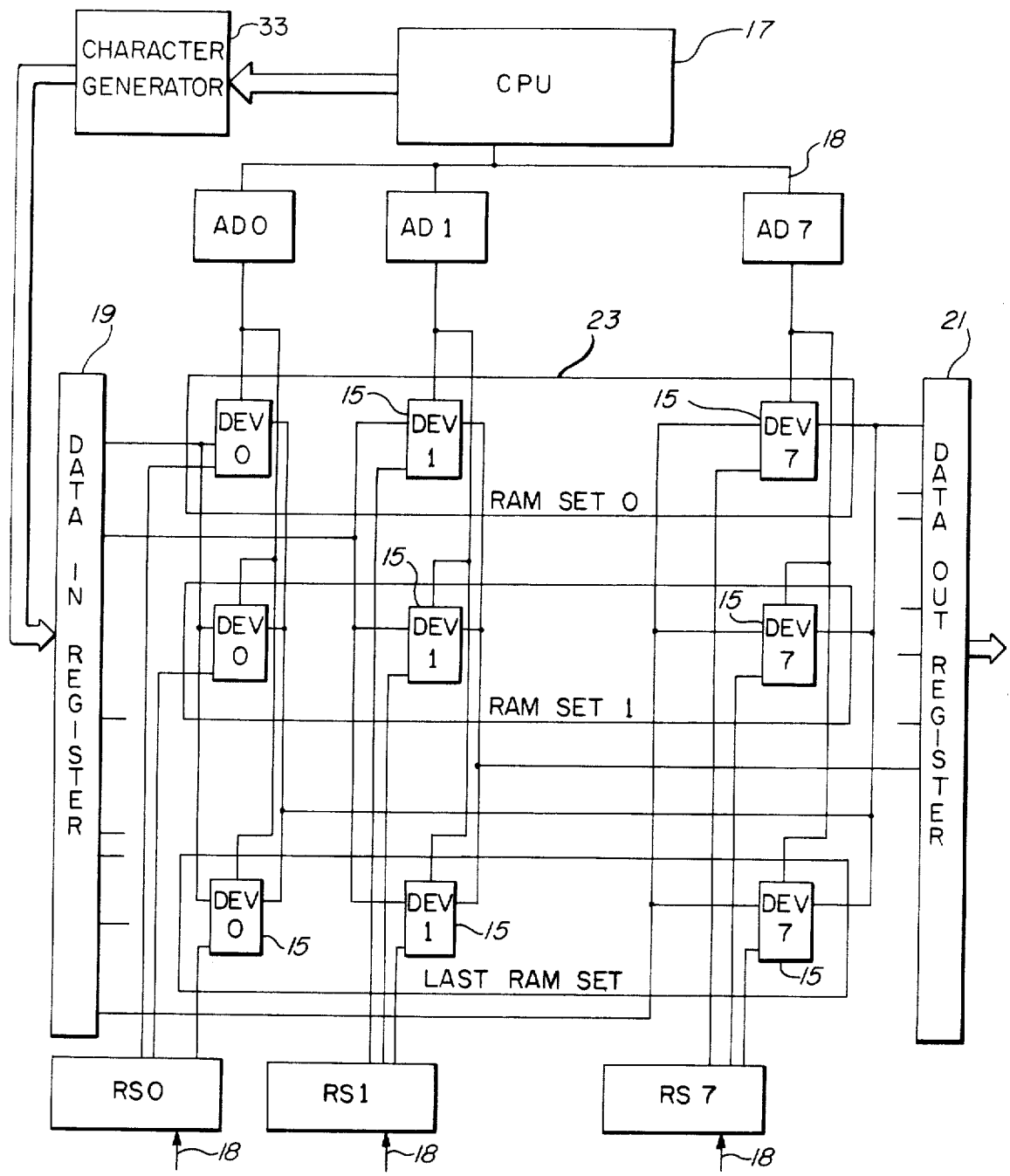
FIG. 1 is a schematic diagram of a memory organized according to the preferred embodiment.

Circuitry for implementing the preferred embodiment is shown in FIG. 1. The memory organization includes a data-in register 19, a data-out register 21, a group of address registers AD0 ... AD7, a group of RAM set select devices RS0 ... RS7, and a matrix of RAM storage devices 15. Each address register AD0 .. . AD7 supplies its address to each RAM device in a particular column. The particular RAM device activated in any column is determined by the RAM set select device RS0 ... RS7 for that column. The RAM set select registers RS0 ... RS7 essentially contain extensions of the addresses in the address registers AD0 ... AD7.

The addresses are provided over an address bus 18 by a central processor 17 preferably constructed of bit slices or discrete logic in order to provide sufficiently rapid addressing capability. Typically, a slower processor informs the faster processor 17 where in the bit-map a character is to be located, and where in the character ROM 33 it is. The high speed processor then addresses the character ROM 33, effects any necessary rotation and calculates the addresses for the address registers AD0 ... AD7 and RS0 ... RS7. Conceptually, of course, one processor could provide all such control functions.

The data-in register 19 and data-out register 21 shown in FIG. 1 preferably include bit shifting and rotating capabilities to align the data bits to the proper RAM device 15. Such capability is used when a character being entered does not align on a position divisible by eight. Then the bits from the character must be shifted over in the map.

Preferably, each RAM storage device of FIG. 1 is a Random Access Memory chip. Each chip is organized as $N_R \times 1$ bits, where $N_R$ is the number of bits in the RAM chip. $N_4 = 2^{2N}A$, where $N_A$ = Number Address lines into the RAM chip. The memory is organized in groups of $N_B$ chips, where $N_B$ is the number of bits that are normally passed to the RAM. In the example discussed herein, 64K RAM chips are used, $N_R = 2^{16}$, $N_A = 8$ and $N_B = 8$. A group of $N_B$ chips will be referred to as a RAM set 23.

Figure 2:
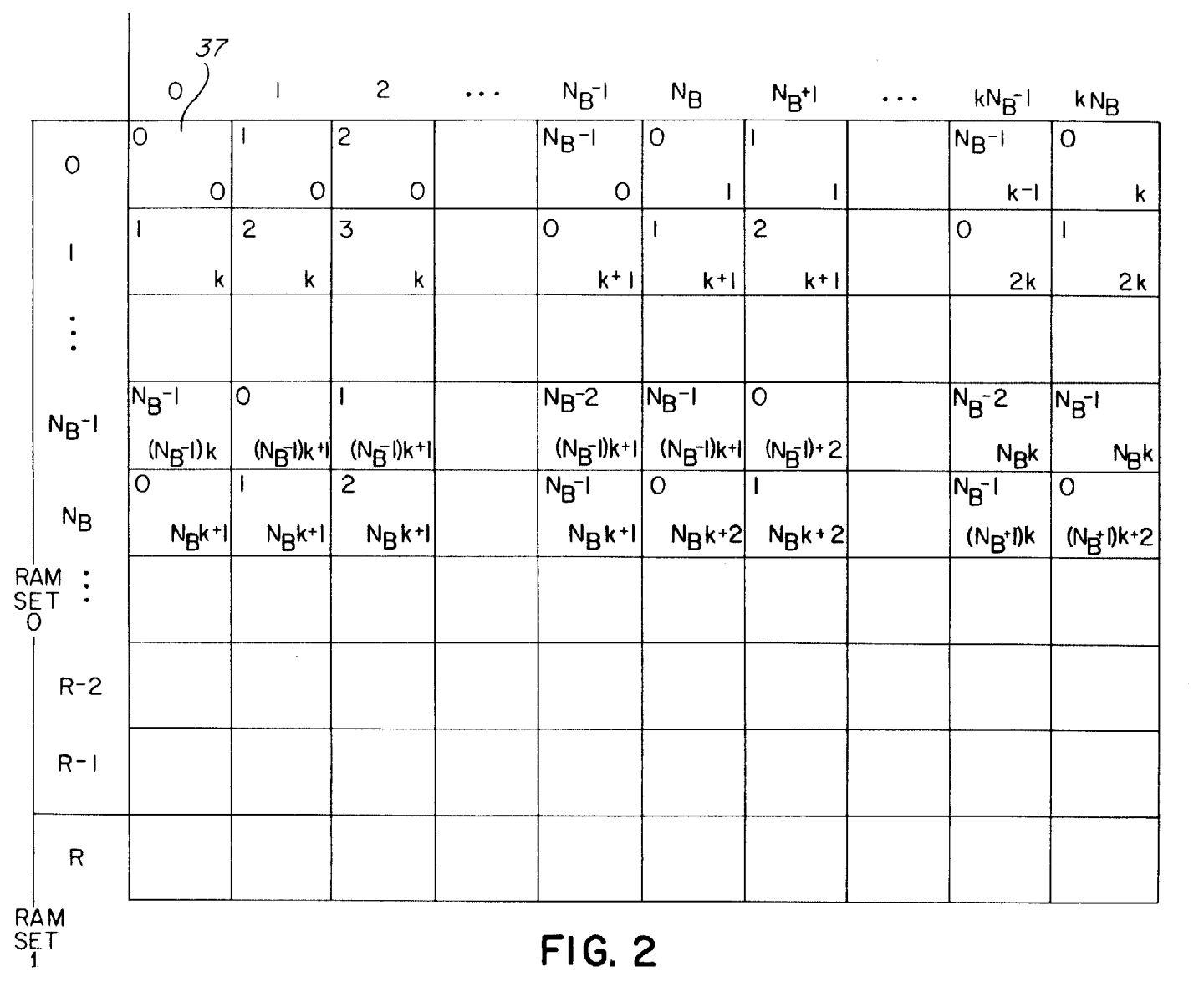

The bit-map for an output device (such as a laser printer) is a 2-dimensional array, as shown in FIG. 2 (although this could be expanded to a 3-dimensional array). Each RAM set 23 describes R adjacent rows of the bit-map. Each row is constrained to contain $KN_B + 1$ bits, where K is an integer related to pixel density and paper width. As an example, for an 11-inch wide piece of paper, having a pixel every 1/240th of an inch, the constant K = 2640.

The variable R is then determined by $R = [(N_R \times N_B) \div (KN_B + 1)]$. Additional RAM sets 23 add additional groups of R rows. If a RAM set 23 ends in the middle of a row, then the next RAM set 23 completes the row.

In the example under discussion where $N_R = 2^{16}$, $N_A = 8$, $N_B = 8$; a typical character is formed on an $X \times Y$ matrix, a typical matrix comprising 24 × 32 pixels (dots). The ROM character generator 33 provides 8 bits (8 pixels) of one row of a character. Successive eight bit bytes are to be stored in the memory of FIG. 1 in one of four orientations selected by the central processor 27 and the outputted to a high speed printer.

Organizing the memory into RAM sets facilitates transferring data into and out of the memory eight bits at a time (eight bits parallel) and addressing eight different devices 15 at once. Parallel addressing is required in order to supply a laser printer or similar high speed output device with data at a sufficient speed.

The eight bits entered into the data-in register 19 from the character generator 33 represent a portion of a character. It is desired to place this data in either a row or a column of the bit-map of FIG. 2. To allow entering the eight bits of data simultaneously, adjacent pixels are placed in different devices 15. Each box in FIG. 2 represents a pixel in the XY grid of the page to be printed. Thus, for example, the bit indicating whether the pixel represented by box 37 is black or blank is located in RAM device 0 in RAM Set 0 at address 0. Similarly, for each box in FIG. 2, the device within the RAM set is indicated in the upper left-hand corner of the box, while the RAM address is indicated in the lower left-hand corner. The bit map of FIG. 2 shows that the adjacent pixels are in different devices in either the horizontal or vertical direction.

As alluded to, data is to be entered into the bit-map in four different manners, providing storage of a character in one of four orientations. In each of the four manners, the data is to be entered as successive groups of eight bits. The four manners are summarized as follows:

Method 1:
The eight data bits are adjacent columns in a row. Successive groups are the same columns in the next row.

Method 2:
The eight data bits are adjacent rows in a column. The successive groups are the same rows in the next column.

Method 3:
The first method where successive groups are the same columns in the previous row.

Method 4:
The second method where successive groups are the same rows in the previous column.

The technique to generate appropriate addresses to the memory of FIG. 1 for each of these methods will now be described.

For writing into the bit-map contained within one RAM set, all RAM set select registers RS0 ... RS7 will be loaded with the RAM set number. For up to 16 RAM sets, the RAM set number is a four-bit extension of the address provided to the address register AD0 .. . AD7. The lowest 16 bits of the address go to the address registers AD0 ... AD7, while the next four bits go the RAM set select registers RS0 ... RS7.

In the following examples, a pixel location, given by row and column addresses $R_i$, $C_i$, specifies an address in a device in a RAM set. That bit location can be described by:

DN = Device Number = $(R_i + C_i)N_B$
AD = Address in Device = $(A) MOD N_R$
RSN = Ram Set Number For Device = $A \div N_R$ where $8N_B + 1$ is the width of a row; i.e., the number of pixels across the page and $A = [((C_i + R_i)(N_B K + 1)) \div N_B]$. In the specific example under discussion, $N_R = 10,000$ HEX and $N_B = 8$.

For all methods, if the width of the data to be written to the bit-map is less than eight, the unused RAM set select registers are set to OFF (Hex), indicating no RAM set has been selected for this device.

Method 1:
Assume the initial position is Device 5 and the initial address is AD0, then the address generation is illustrated as follows:

ADDRESS REGISTERS

| Count | AReg0 | AReg1 | AReg2 | AReg3 |
|---|---|---|---|---|
| 0 | AD0+1 | AD0+1 | AD0+1 | AD0+1 |
| 1 | AD0+1+K | AD0+1+K | AD0+1+K | AD0+1+K |
| 2 | AD0+1+2K | AD0+1+2K | AD0+1+2K | AD0+1+2K |
| 3 | AD0+1+3K | AD0+1+3K | AD0+1+3K | AD0+1+3K |
| 4 | AD0+2+4K | AD0+1+4K | AD0+1+4K | AD0+1+4K |

| Count | AReg4 | AReg5 | AReg6 | AReg7 |
|---|---|---|---|---|
| 0 | AD0+1 | AD0 | AD0 | AD0 |
| 1 | AD0+1+K | AD0+1+K | AD0+K | AD0+K |
| 2 | AD0+1+2K | AD0+1+2K | AD0+1+2K | AD0+2K |
| 3 | AD0+1+3K | AD0+1+3K | AD0+1+3K | AD0+1+3K |
| 4 | AD0+1+4K | AD0+1+4K | AD0+1+4K | AD0+1+4K |

The rule to be followed by the central processor 17 to generate address $$AREG_i^r \ r = \text{row } \#,$$

i = device # when changing to row r from row r−1 is:

$$AREG_i^r = AREG_{i-1}^{r-1} + K, \text{ for } i > 0$$

$$AREG_i^r = AREG_{N_B-1}^{r-1} + 1 + K, \text{ for } i = 0 \text{ or}$$

$$AREG_0^r = AREG_7^{r-1} + 1 + K$$

Method 2:
Initial position is device 5, AD0, then the address generation is as follows:

COLUMN COUNT

| Address Register | 0 | 1 |
|---|---|---|
| AREG0 | AD0−5K | AD0−6K |
| AREG1 | AD0−4K | AD0−5K |
| AREG2 | AD0−3K | AD0−4K |
| AREG3 | AD0−2K | AD0−3K |
| AREG4 | AD0−K | AD0−2K |
| AREG5 | AD0 | AD0−K |
| AREG6 | AD0−7K−1 | AD0 |
| AREG7 | AD0−6K−1 | AD0−7K−1 |

| Address Register | 2 | 3 | ... | 8 |
|---|---|---|---|---|
| | AD0−7K | AD0+1 | ... | AD0−5K+1 |
| | AD0−6K | AD0−7K | ... | AD0−4K+1 |
| | AD0−5K | AD0−6K | ... | AD0−3K+1 |
| | AD0−4K | AD0−5K | ... | AD0−2K+1 |
| | AD0−3K | AD0−4K | ... | AD0−K+1 |
| | AD0−2K | AD0−3K | ... | AD0+1 |
| | AD0−K | AD0−2K | ... | AD0−7K |
| | AD0 | AD0−K | ... | AD0−6K |

The rule for changing address for the next column c, given device is is:

$$AREG_i^c = AREG_{i-1}^{c-1}, \text{ for } i > 0$$

$$AREG_i^c = AREG_{N_B-1}^{c-1} + 1, \text{ for } i = 0$$

or $AREG_0^c = AREG_7^{c-1} + 1$.

Method 3:
Initial position is device 5, AD0, then the address generation is illustrated as follows:

ADDRESS REGISTERS

| Row Count | AREG0 | AREG1 | AREG2 | AREG3 |
|---|---|---|---|---|
| 0 | AD0 | AD0 | AD0 | AD0 |
| 1 | AD0−K | AD0−K | AD0−K | AD0−K |
| 2 | AD0−2K | AD0−2K | AD0−2K | AD0−2K |

-continued

| | | | | |
|---|---|---|---|---|
| 6 | AD0−6K−1 | AD0−6K−1 | AD0−6K−1 | AD0−6K−1 |
| 7 | AD0−7K−1 | AD0−7K−1 | AD0−7K−1 | AD0−7K−1 |

| Row Count | AREG4 | AREG5 | AREG6 | AREG7 |
|---|---|---|---|---|
| 0 | AD0 | AD0 | AD0−1 | AD0−1 |
| 1 | AD0−K | AD0−K−1 | AD0−K−1 | AD0−K−1 |
| 2 | AD0−2K−1 | AD0−2K−1 | AD0−2K−1 | AD0−2K−1 |
| . | | | | |
| . | | | | |
| 6 | AD0−6K−1 | AD0−6K−1 | AD0−6K−1 | AD0−6K−1 |
| 7 | AD0−7K−1 | AD0−7K−1 | AD0−7K−1 | AD0−7K−2 |

The rule for changing to row r for device i is:

$$AREG_i^r = AREG_{i+1}^{r-1} - K, \text{ for } i < N_{B-1} \text{ (or } i < 7);$$

$$AREG_{N_{B-1}}^r = AREG_0^{r-1} - K - 1, \text{ for } i = 7 \text{ or}$$

$$AREG_7^r = AREG_0^{r-1} - K - 1$$

Method 4:
Initial position is device 5, AD0, then the address generation is illustrated as follows:

COLUMN COUNT

| Address Register | 0 | 1 |
|---|---|---|
| AREG0 | AD0+3K+1 | AD0+4K+1 |
| AREG1 | AD0+4K+1 | AD0+5K+1 |
| AREG2 | AD0+5K+1 | AD0+6K+1 |
| AREG3 | AD0+6K+1 | AD0+7K+1 |
| AREG4 | AD0+7K+1 | AD0 |
| AREG5 | AD0 | AD0+K |
| AREG6 | AD0+K | AD0+2K |
| AREG7 | AD0+2K | AD0+3K |

| Address Register | ... | 6 | 7 |
|---|---|---|---|
| | | AD0 | AD0+K |
| | | AD0+K | AD0+2K |
| | | AD0+2K | AD0+3K |
| | | AD0+3K | AD0+4K |
| | | AD0+4K | AD0+5K |
| | | AD0+5K | AD0+6K |
| | | AD0+6K | AD0+7K |
| | | AD0+7K | AD0−1 |

The rule is as follows:

$$AREG_i^c = AREG_{i+1}^{c-1}, i < N_{B-1} \text{ (or } i < 7);$$

$$AREG_{N_{B-1}}^c = AREG_0^{c-1} - 1, i = N_{B-1} \text{ or}$$

$$AREG_7^c = AREG_0^{c-1} - 1.$$

Once the character information is stored in a selected orientation, the data output is more conventional. To output data from the memory, all address registers AD0 ... AD7 are set to the beginning address and incremented to read the stored bits out a row at a time for one RAM set. After the first RAM set is read out, the next RAM set is addressed and the address registers AD0 to AD7 are again provided with successively incremented addresses. A pixel row may be read out eight bits at a time or one bit at a time depending upon the requirements of the output device.

The foregoing discussion provides both a specific example and a generalized approach to organizing and addressing a memory structure to achieve storage of characters in multiple orientations. The subject invention is thus subject to adaptation and modification. Therefore, it is to be understood that, within the scope of the appended claims, the invention may be practiced other than as specifically described herein.

What is claimed is:

1. Apparatus for providing character data bits to an output device comprising:

means for storing and outputting data bits comprising a plurality of characters;

a memory means having a plurality of address lines and a plurality of input lines, the input lines being connected to receive a character from said storing means, said address lines being connectable for receiving a plurality of first address groups each defining a selected character orientation, said memory means being responsive to each address group to store a character in said said memory means in the orientation defined by said address group, said memory means further having a plurality of output lines for outputting a stored character upon receipt of a plurality of second addresses; and means connected to said address lines for addressing said memory means with one of said address groups to cause storage of a character in a selected orientation and for addressing said memory means with said second addresses for supplying character data bits to said output device;

wherein the orientations are selected according to the following addresses:

$$AREG_i^r = AREG_{i-1}^{r-1} + K, \text{ for } i > 0 \quad \text{(a)}$$

$$AREG_i^r = AREG_{N_{B-1}}^{r-1} + 1 + K, \text{ for } i = 0$$

or $$AREG_0^r = AREG_7^{r-1} + 1 + K$$

where r=row number, i=device number and AREG equals the address for changing to row r from row r−1;

$$AREG_i^c = AREG_{i-1}^{c-1}, \text{ for } i > 0 \quad \text{(b)}$$

$$AREG_i^c = AREG_{N_{B-1}}^{c-1} + 1, \text{ for } i = 0$$

or $$AREG_0^c = AREG_7^{c-1} + 1$$

where AREG is the address and c is the column changed-to, give device i;

$$AREG_i^r = AREG_{i+1}^{r-1} - K, \text{ for } i < N_B - 1 \text{ (or } i < 7); \quad \text{(c)}$$

$$AREG_{N_{B-1}}^r = AREG_0^{r-1} - K - 1, \text{ for } i = 7$$

or $$AREG_7^r = AREG_0^{r-1} - K - 1$$

where AREG is the address and r is the row changed-to for device i;

$$AREG_i^c = AREG_{i+1}^{c-1}, i < N_B - 1 \text{ (or } i < 7\text{)}; \quad (d)$$

$$AREG_{N_B-1}^c = AREG_0^{c-1} - 1, i = N_B - 1$$

or $$AREG_7^c = AREG_0^{c-1} - 1$$

where AREG is the address, c is the column changed-to for device i, and wherein $N_B$ is the number of bits passed in parallel to said matrix and K is an integer.

2. The apparatus of claim 1 wherein said means for storing comprises a character generator read-only memory.

3. The apparatus of claim 2 wherein said means for addressing includes a central processor means connected to said plurality of address lines.

4. The apparatus of claim 3 wherein said central processor means further provides addresses to said character generator read-only memory to cause outputting of said character data bits.

5. The apparatus of claim 4 wherein said memory means is organized into a matrix, each row of which comprises a set of random access memory chips.

6. The apparatus of claim 5 wherein each column of said matrix has first and second address registers connected to the random access memory chips therein.

7. The apparatus of claim 6 wherein each second address register contains an extension of the address in the first address register in the same column.

8. The data storage system of claim 1 wherein said means for addressing comprises:
 a central processor means for providing addresses; and
 a plurality of address register means for receiving said addresses and applying them to said memory means.

9. The data storage system of claim 8 wherein said address registers comprise a first and second address register for each column of said matrix.

10. A data storage system comprising:
 a character generator read only memory (ROM) supplying a character as a plurality of successive data bytes;
 a data-in register means for receiving a data byte from said ROM and for storing the data byte;
 a memory means including a plurality of random access memory devices organized into RAM SETS, each RAM SET including $N_B$ devices where $N_B$ equals the number of bytes in a said character, each device being organized as $N_R \times 1$ bits where $N_R$ is the number of bits stored in each device;
 wherein each RAM SET describes R adjacent rows of a bit map, each row constrained to contain $KN_B+1$ bits where K is an integer, wherein R equals $[(N_R \times N_B)-(KN_B+1)]$; said memory means further including address storage register means for storing address bits for selecting a particular device in a RAM SET and a particular storage location in a selected device; and
 means for generating addresses and supplying said addresses to said RAM SET address register means and such that each successive byte is entered into storage locations in said memory means in such a manner that said character is stored in one of a selected plurality of possible orientations;

wherein said means for generating addresses generates said addresses for four orientations employing the following definitions:

$$AREG_i^r = AREG_{i-1}^{r-1} + K, \text{ for } i > 0 \quad (a)$$

$$AREG_i^r = AREG_{N_B-1}^{r-1} + 1 + K, \text{ for } i = 0$$

or $$AREG_0^r = AREG_7^{r-1} + 1 + K$$

where r=row number, i=device number and AREG equals the address for changing to row r from row r−1.

$$AREG_i^r = AREG_{i-1}^{r-1}, \text{ for } i > 0 \quad (b)$$

$$AREG_i^r = AREG_{N_B-1}^{r-1} + 1, \text{ for } i = 0$$

or $$AREG_0^r = AREG_7^{r-1} + 1$$

where AREG is the address and c is the column changed-to, given device i;

$$AREG_i^r = AREG_{i+1}^{r-1} - K, \text{ for } i < N_B - 1 \text{ (or } i < 7\text{)}; \quad (c)$$

$$AREG_{N_B-1}^r = AREG_0^{r-1} - K - 1, \text{ for } i = 7$$

or $$AREG_7^r = AREG_0^{r-1} - K - 1$$

where AREG is the address and r is the row changed-to for device i;

$$AREG_i^c = AREG_{i+1}^{c-1}, i < N_B - 1 \text{ (or } i < 7\text{)}; \quad (d)$$

$$AREG_{N_B-1}^c = AREG_0^{c-1} - 1, i = N_B - 1$$

or $$AREG_7^c = AREG_0^{c-1} - 1$$

where AREG is the address, c is the column changed-to for device i, and wherein $N_B$ is the number of bits passed in parallel to said matrix and K is an integer.

11. Apparatus for providing character data bits to an output device comprising:
 memory means constructing a bit-map structure;
 means for storing and outputting data bits comprising a plurality of characters;
 a data-in means for supplying the data bits from said storing and outputting means to said memory means;
 a data-out means for outputting the data bits from said memory means to the output device;
 an addressing means for supplying addresses to said memory means so as to store the data bits supplied from said data-in means in accordance with selected one of four predetermined addressing rules and to output the data bits through said data-out means in accordance with an orderly addressing rule regardless of said four addressing rules, and said four addressing rules being defined so that the character output by the output device is directed into a selected orientation corresponding to a selected one of said four addressing rules;

wherein said memory means includes a plurality of random access storage devices which are organized as rows of N devices where N is the number of bits passed from said data-in means to said memory means and each random access storage device is organized as $N \times 1$ bits where N is the number of bits storable in each device;

wherein said data-in means includes a first register having lines of N which are connected to each random access storage device so that each one of the lines is connected in common with the random access storage device consisting of one row and said data-out means includes a second register having lines of N which are connected to the random access storage devices in the same manner as that of the first register; and wherein said four addressing rules are as follows:

$$AREG_i^r = AREG_{i-1}^{r-1} + K, \text{ for } i > 0 \quad (a)$$

$$AREG_i^r = AREG_{N-1}^{r-1} + 1 + k, \text{ for } i = 0$$

$$\text{or } AREG_0^r = AREG_7^{r-1} + 1 + K$$

where r=row number, i=device number, K is an integer related to pixel density and paper width and AREG equals the address for changing to row r from r−1;

$$AREG_i^c = AREG_{i-1}^{c-1}, \text{ for } i > 0 \quad (b)$$

$$AREG_i^c = AREG_{N-1}^{c-1} +, \text{ for } i = 0$$

$$\text{or } AREG_0^c = AREG_7^{c-7} + 1$$

where AREG is the address and c is the column changed-to for device i;

$$AREG_i^r = AREG_{i+1}^{r-1} - K, \text{ for } i < N - 1 \text{ (or } i < 7) \quad (c)$$

$$AREG_{N-1}^r = AREG_0^{r-1} - K - 1, \text{ for } i = 7$$

$$\text{or } AREG_7^r = AREG_0^{r-1} - K - 1$$

where AREG is the address and r is the row changed-to for device i.

$$AREG_i^c = AREG_{i+1}^{c-1}, i < N - 1 \text{ (or } i < 7) \quad (d)$$

$$AREG_{N-1}^c = AREG_0^{c-1} - 1, i = N - 1$$

$$\text{or } AREG_7^c = AREG_0^{c-1} - 1$$

where AREG is the address and c is the column changed-to for device i.

12. Apparatus as claimed in claim 11 wherein said addressing means includes an address register means connected to each random access storage device and a central processor means connected to said address register means for providing addresses to said storing and output means to cause outputting of the character data bits.

13. Apparatus as claimed in claim 12 wherein said random access storage devices are organized into n sets, each set comprising the random access storage devices of each row where n is a number determined in accordance with a size of the bit-map memory area.

14. Apparatus for providing character bits to an output device comprising:
a memory means including a plurality of random access storage devices which are organized into a matrix of $N \times n$ where N is the number of bits passed in parallel to said matrix and n is the number determined in accordance with a size of a memory area;

means for storing and outputting the data bits comprising a plurality of characters;

a data-in means for supplying the data bits from said storing and outputting means to said memory means;

a data-out means for outputting the data bits from said memory means to the output device;

an addressing means for supplying addresses to said memory means so as to store the data bits supplied from said data-in means in accordance with a selected one of four predetermined addressing rules and to output the data bits through said data-out means in accordance with an orderly addressing rule regardless of said four addressing rules, and said four addressing rules being defined so that the character output by the output device is directed into a selected orientation corresponding to a selected one of said four addressing rules;

wherein said matrix is constructed as a bit-map containing KN+1 bits in a row where K is an integer related to pixel density and paper width and one set of random access storage devices describe R adjacent rows of the bit map; and wherein said four addressing rules are as follows:

$$AREG_i^r = AREG_{i-1}^{r-1} + K, \text{ for } i > 0 \quad (a)$$

$$AREG_i^r = AREG_{N-1}^{r-1} + 1 + K, \text{ for } i = 0$$

$$\text{or } AREG_0^r = AREG_7^{r-1} + 1 + K$$

where r is row number, i is device number and AREG equals the address for changing to row r from r−1;

$$AREG_i^c = AREG_{i-1}^{c-1}, \text{ for } i > 0 \quad (b)$$

$$AREG_i^c = AREG_{N-1}^{c-1} +, \text{ for } i = 0$$

$$\text{or } AREG_0^c = AREG_7^{c-7} + 1$$

where AREG is the address and c is the column changed-to for device i;

$$AREG_i^r = AREG_{i+1}^{r-1} - K, \text{ for } i < N - 1 \text{ (or } i < 7) \quad (c)$$

$$AREG_{N-1}^r = AREG_0^{r-1} - K - 1, \text{ for } i = 7$$

$$\text{or } AREG_7^r = AREG_0^{r-1} - K - 1$$

where AREG is the address and r is the row changed-to for device i;

$$AREG_i^c = AREG_{i+1}^{c-1}, i < N - 1 \text{ (or } i < 7) \quad (d)$$

$$AREG_{N-1}^c = AREG_0^{c-1} - 1, i = N - 1$$

$$\text{or } AREG_7^c = AREG_0^{c-1} - 1$$

where AREG is the address and c is the column changed-to for device i.

15. Apparatus is claimed in claim 14 wherein said data-in means includes a first register having lines of N which are connected to each random access storage device so that each one of lines is connected in common with the random access storage devices consisting of one row and said data-out means includes a second register having lines of N which are connected to the random access storage devices in the same manner as that of the first register.

16. Apparatus as claimed in claim 15 wherein said addressing means includes an address register means.

17. Apparatus as claimed in claim 16 wherein said storing and outputting means is responsive to addresses to output character data bits and wherein said addressing means further provides addresses to said storing and outputting means to cause outputting of the character data bits.

18. Apparatus as claimed in claim 17 wherein said random access storage devices are organized into n sets each set comprising the random access storage devices of each row where n is a number determined in accordance with a size of the bit-map memory area.

* * * * *